United States Patent [19]
Beaman et al.

[11] Patent Number: 5,352,405
[45] Date of Patent: Oct. 4, 1994

[54] THERMAL CONTROL OF SELECTIVE LASER SINTERING VIA CONTROL OF THE LASER SCAN

[75] Inventors: Joseph J. Beaman, Austin, Tex.; Joseph C. McGrath, Calistoga; Frost R. R. Prioleau, Piedmont, both of Calif.

[73] Assignee: DTM Corporation, Austin, Tex.

[21] Appl. No.: 992,926

[22] Filed: Dec. 18, 1992

[51] Int. Cl.⁵ .............................. B22F 3/10; B22F 5/00
[52] U.S. Cl. ....................................... 419/45; 419/47; 419/5; 219/121.64; 219/121.6; 219/121.85; 264/22
[58] Field of Search ................ 156/62.2; 219/121.6, 219/121.63, 121.64, 121.85; 264/22, 219; 419/45; 425/174.4; 428/551

[56] References Cited

U.S. PATENT DOCUMENTS

| | | | |
|---|---|---|---|
| 4,247,508 | 1/1981 | Householder | 264/219 |
| 4,575,330 | 3/1986 | Hull | 425/174.4 |
| 4,863,538 | 8/1989 | Deckard | 156/62.2 |
| 4,929,402 | 5/1990 | Hull | 264/22 |
| 4,938,816 | 7/1990 | Beaman et al. | 156/62.2 |
| 4,944,817 | 7/1990 | Bourell et al. | 156/62.2 |
| 5,017,753 | 5/1991 | Deckard | 219/121.63 |
| 5,053,090 | 10/1991 | Beaman et al. | 156/62.2 |
| 5,076,869 | 12/1991 | Bourell et al. | 156/62.2 |
| 5,147,587 | 9/1992 | Marcus et al. | 264/22 |
| 5,155,322 | 10/1992 | Grube et al. | 219/121.6 |
| 5,155,324 | 10/1992 | Deckard et al. | 219/121.63 |
| 5,156,697 | 10/1992 | Bourell et al. | 156/62.2 |
| 5,182,170 | 1/1993 | Marcus et al. | 156/62.2 |

FOREIGN PATENT DOCUMENTS 8802677 5/1992 PCT Int'l Appl. .

*Primary Examiner*—Donald P. Walsh
*Assistant Examiner*—John N. Greaves
*Attorney, Agent, or Firm*—Vinson & Elkins

[57] ABSTRACT

A method and apparatus for fabricating three-dimensional objects according to the selective laser sintering process are disclosed. In order to reduce inconsistencies in structural and textural integrity, and in thermal effects that can cause distortion, methods for ensuring that overlapping laser scans are accomplished in a consistent manner relative to the thermal flow from the sintered locations are utilized. Methods are disclosed for achieving this by limiting the extent to which the laser scans object areas in the powder layers so that the time-to-return for adjacent overlapping scans is minimized; such minimization results in significantly less variation in the time-to-return overall.

12 Claims, 4 Drawing Sheets

THERMAL CONTROL OF SELECTIVE LASER SINTERING VIA CONTROL OF THE LASER SCAN

This invention is in the field of the fabrication of objects by the selective laser fusing of materials in a layerwise fashion, and is more specifically directed to thermal control of the selective laser sintering process.

BACKGROUND OF THE INVENTION

Recent advances have been made in the field of producing three-dimensional objects, such as prototype parts and finished parts in small quantities, directly from computer-aided-design (CAD) data bases. Various technologies are known to produce such parts, particularly through the use of additive processes, as opposed to subtractive processes such as conventional machining. An important additive process for the production of such objects is selective laser sintering, recently commercialized by DTM Corporation. According to the selective laser sintering process, a powder is scanned in layerwise fashion by a directed energy beam, such as a laser, to fuse the powder at selected locations corresponding to cross-sections of the object. Fused locations within each layer adhere to fused portions of previously fused layers, so that a series of layers processed in this manner results in a finished part. Computer control of the scanning of the energy beam thus enables direct transfer of a design in a computer-aided-design (CAD) data base into a physical object.

The selective laser sintering technology is described in further detail in U.S. Pat. No. 4,247,508 issued Jan. 27, 1981, now assigned to DTM Corporation and incorporated herein by reference, and in U.S. Pat. No. 4,863,538 issued Sep. 9, 1989, U.S. Pat. No. 5,017,753 issued May 21, 1991, U.S. Pat. No. 4,938,816 issued Jul. 3, 1990, and U.S. Pat. No. 4,944,817 issued Jul. 31, 1990, all assigned to Board of Regents, The University of Texas System and also incorporated herein by this reference. As described in the above-noted patents, and also in U.S. Pat. No. 5,156,697 issued Oct. 20, 1992, U.S. Pat. No. 5,147,587 issued Sep. 15, 1992, and U.S. Pat. No. 5,182,170 issued Jan. 26, 1993, all also assigned to Board of Regents, The University of Texas System and incorporated herein by this reference, various materials and combinations of materials can be processed according to this method, such materials including plastics, waxes, metals, ceramics, and the like. In addition, as described in these patents and applications, the parts produced by selective laser sintering may have shapes and features which are sufficiently complex as to not be capable of fabrication by conventional subtractive processes such as machining. This complexity is enabled by the natural support of overhanging fused portions of the object that is provided by unfused powder remaining in prior layers.

Further refinements in the selective laser sintering process, and advanced systems and machines for performing selective laser sintering, are described in U.S. Pat. No. 5,155,321 issued Oct. 13, 1992, commonly assigned herewith, U.S. Pat. No. 5,155,324 issued Oct. 13, 1992, and International Publication WO 92/08592, all of which are incorporated herein by reference. Copending application Ser. No. 789,358, filed Nov. 8, 1991, commonly assigned herewith and incorporated herein by this reference, further describes an advanced apparatus for selective laser sintering in which powder is dispensed from either side of the target surface.

The selective laser sintering process is primarily a thermal process, as the object is formed by the sintering or other fusing of powder at selected locations of a layer that receive directed energy from the laser sufficient to reach the fusing or sintering temperature. Those portions of each powder layer that do not receive the laser energy are to remain unfused, and thus must remain below the fusing or sintering temperature. In addition, the temperature of the powder receiving the laser energy will generally be higher than the temperature of underlying prior layers (fused or unfused). As such, significant thermal gradients are present at the target surface of the powder in the selective laser sintering process.

It has been observed that these thermal gradients can result in distortion of the object being produced, thus requiring thermal control of the selective laser sintering process in order for the objects produced to precisely meet the design. One cause of such distortion is warpage and shrinkage of the object due to thermal shrinkage of the sintered layers it cools from the sintering temperature to its post-sintering temperature; in addition, shrinkage can occur due to the reduction in volume of the fused powder as it passes through the phase change from liquid to solid. In either case, the reduction in volume of the sintered powder will cause the top of the object to contract. Since underlying layers have already contracted, being immersed in the fairly good thermal insulator of unfused powder, tensile stress is induced at the surface, and curling of the object can result.

Another source of distortion in the production of objects by selective laser sintering is undesired growth of the part being produced beyond the volume defined by the laser beam. As is well known, the spot size of a laser beam can be made quite small so that the resolution of features in the object can be quite sharp. However, conduction of heat from the fused locations can cause powder outside of the scan to sinter to the directly sintered portion, causes the fused cross-section to "grow" beyond the area of the laser scan, and thus beyond the design dimensions. Growth can also occur from layer to layer if sufficient heat from sintering remains in the fused portion that newly dispensed powder (in the next layer) sinters to the prior layer as it is dispensed.

As described in the above-referenced U.S. Pat. No. 5,017,753 and U.S. Pat. No. 5,155,321, control of the temperature of the sintered and unsintered powder at the target surface in the selective laser sintering process is important in minimizing such distortion in the object being produced. It has been newly discovered, however, that the manner in which the laser scans the selected portion of each layer to be fused in fabricating the part is a large factor in the consistency of the formation of the cross-section of the object being formed.

Another laser-based process for forming of three-dimensional objects is commonly referred to as stereolithography. According to the stereolithography technique, as described in U.S. Pat. Nos. 4,575,330 and 4,929,402, a directed light beam such as a laser is used to cure selected portions of the surface of a vat of photopolymer. Considering the heat produced by the irradiation of any material with a laser, as well as the heat released in polymerization, it is contemplated that thermal effects are also present at the surface of objects formed according to the stereolithography process, and that result in distortion. It is further contemplated that such effects are in large part due to the energy imparted by the laser and released from the polymerization, the amount of such energy differing among the various locations within the layer.

By way of further background, in conventional selective laser sintering systems, the laser scans the target surface in a raster scan mode; as described in the above-referenced U.S. Pat. No. 5,155,324, such raster scanning may be done in combination with outlining of the cross-section of the object to be formed by the laser in a vector mode. In performing the raster scan, these conventional systems scan across substantially the entire target surface in one dimension, turning the laser on and off at the boundaries of the cross-section, regardless of the size, shape or location of the article being formed; in addition, the scans are incremented in such a manner as to overlap the prior scan. Accordingly, the time between adjacent and overlapping scans of the cross-section of the object being formed may widely vary according to the position of the object in the part bed, the size of the cross-section, and the direction of scan. It is believed that such variations in this time is the cause of inconsistent object formation, including variations in texture and distortion effects.

It is therefore an object of the present invention to control the thermal effects of the laser scan within the fused locations in each layer, so that the thermal effects of the laser heat are made consistent.

It is a further object of the present invention to so control these thermal effects in a manner consistent with the formation of multiple objects in a single build cycle.

It is a further object of the present invention to so control these thermal effects while minimizing the scan time of the laser for each layer of powder.

It is a further object of the present invention to so control these thermal effects for both powder-based and liquid-based processes.

Other objects and advantages of the present invention will be apparent to those of ordinary skill in the art having reference to the following specification together with the drawings.

SUMMARY OF THE INVENTION

The present invention may be implemented into a method and apparatus for fabricating a three-dimensional object by use of a laser to fuse selected locations of a material in a layer, in which the scan of the laser over the selected locations is controlled to uniformly irradiate each selected location of each layer. According to a first aspect of the invention, the scan area of the laser outside of the selected locations is reduced, so that the time between scans of overlapping regions of the material is made uniformly short.

DETAILED DESCRIPTION OF THE PREFERRED EMBODIMENTS

Figure 1:
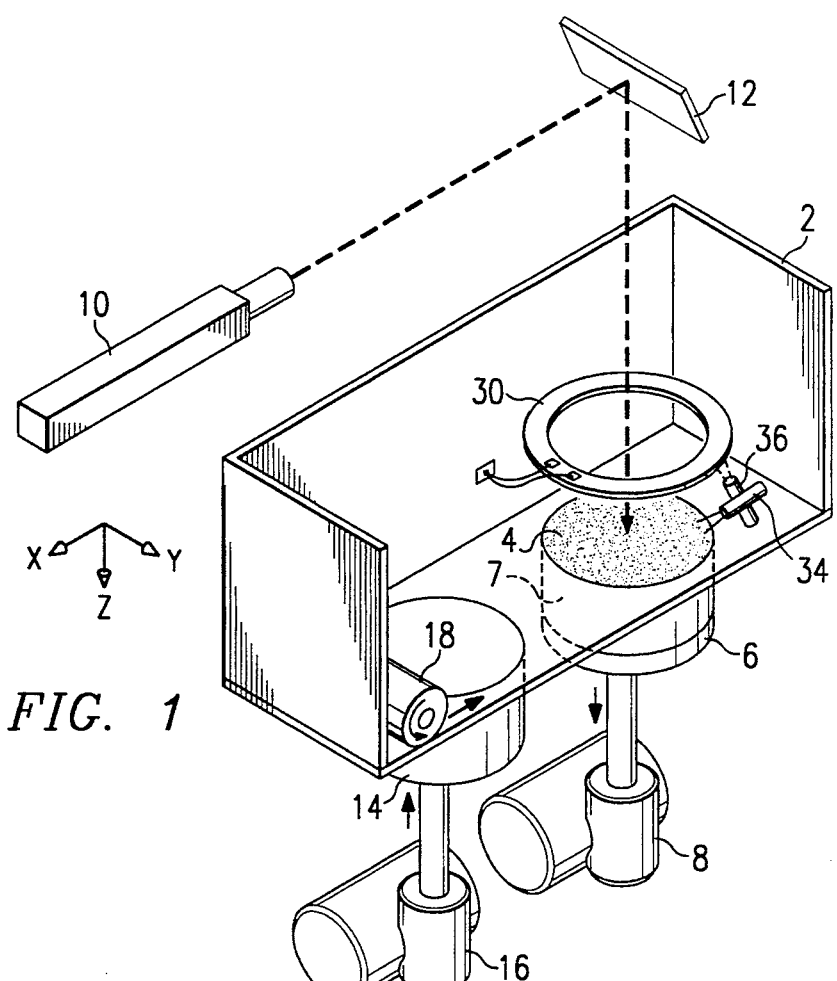
FIG. 1 is a schematic diagram of a selective laser sintering apparatus for producing three-dimensional objects from a powder in layerwise fashion, and into which the present invention is incorporated.

An apparatus for performing selective laser sintering according to the present invention will now be described relative to the schematic representation illustrated in FIG. 1. The apparatus of FIG. 1 includes a chamber 2 (front doors and the top of chamber 2 are not shown in FIG. 1, for purposes of clarity), within which the selective sintering process takes place. Target surface 4, for purposes of the description herein, refers to the top surface of heat-fusible powder (including portions previously sintered, if present) disposed on part piston 6; the sintered and unsintered powder disposed on part piston 6 will be referred to herein as part bed 7. The vertical motion of part piston 6 is controlled by motor Laser 10 provides a beam which is reflected by galvanometer-controlled mirrors 12 (only one of which is shown for clarity), in the manner described in the U.S. Patents referred to hereinabove and as shown in FIG. 2.

Figure 2:
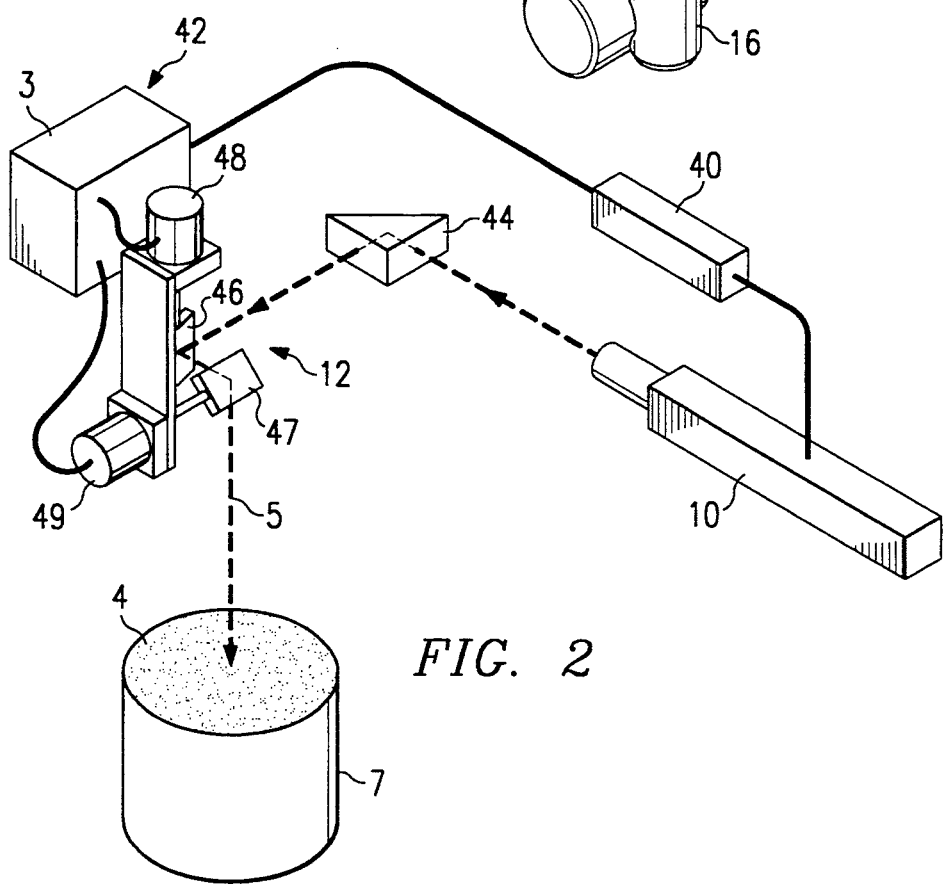
FIG. 2 is an isometric and schematic view of the portion of the apparatus of FIG. 1 which controls the direction of the laser beam to the target surface.

FIG. 2 illustrates laser 10 and the apparatus for its control. The components of the laser system are shown in FIG. 2 as integrated within laser head 10. Laser head 10 thus includes such conventional control elements as described in the above-referenced U.S. Pat. No. 4,863,538, for example a safety shutter, a front mirror assembly, and focusing elements such as diverging and converging lenses. The type of laser 10 used is of course dependent upon many factors, and in particular upon the type of powder that is to be sintered. A preferred laser is a Synrad Model C48-115 $CO_2$ laser. Laser 10 is preferably controllable to be modulated on and off; while on, laser 10 produces laser beam 5 which travels generally along the path shown by the arrows in FIG. 2.

Computer 40 and scanning system 42 are also included for controlling the direction of the laser beam as it impinges target surface 4. In this preferred embodiment, computer 40 includes a microprocessor for controlling laser 10, and further includes a CAD/CAM system for generating the data by which the dimensions of the part to be produced is defined. A conventional personal computer workstation, such as a model 386-33 manufactured and sold by Austin Computer Systems, based on an 80386 microprocessor as manufactured and sold by Intel Corporation and preferably including a math coprocessor such as an 80387 math coprocessor manufactured and sold by Intel Corporation, is suitable for use as computer 40 in the preferred embodiment.

Scanning system 42 includes prism 44 for redirecting the path of travel of the laser beam; the number of prisms 44 necessary for directing the laser beam to the proper location is based on the physical layout of the apparatus. Alternatively, as is well known in the art, one or more fixed mirrors can be used in place of prism 44 for directing laser beam 5 from laser 10 to the scanning system 42, depending upon the particular layout of the equipment. Scanning system 42 further includes a pair of mirrors 46, 47 which are driven by respective galvanometers 48, 49. Galvanometers 48, 49 are coupled to their respective mirrors 46, 47 to selectively orient the mirrors 46, 47 and control the aim of laser beam 5. Galvanometers 48, 49 are mounted perpendicularly to one another so that mirrors 46, 47 are mounted nominally at a right angle relative to one another. Function generator driver 32 controls the movement of galvanometers 48 and 49, to control the aim of laser beam 5 within target surface 4, and in conjunction with its on and off modulation controlled by computer 40. Driver 32 is coupled to computer 40, so that the CAD/CAM data within computer 40 can be realized in the directional control of the laser beam via mirrors 46, 47. It is contemplated that alternative scanning systems may be used in place of scanning system 42, including such apparatus as acousto-optic scanners, rotating polygonal mirrors, and resonant mirror scanners.

Referring back to FIG. 1, delivery of the heat-fusible powder is accomplished in the apparatus of FIG. 1 by way of powder piston 14, controlled by motor 16, and by counter-rotating roller 18. As described in the PCT publication No. 88/02677, counter-rotating roller 18 transfers the powder lifted above the floor of chamber 2 to the target surface 4 in a uniform and level fashion. As described in the above-referenced copending application Ser. No. 789,358, filed Nov. 8, 1991, it may be preferred to provide two powder pistons 14 on either side of part piston 6, for purposes of efficient and flexible powder delivery.

In operation, the apparatus of FIG. 1 supplies powder to chamber 2 via powder cylinder 14; powder is placed into chamber 2 by the upward partial motion of powder cylinder 14 provided by motor 16. Roller 18 (preferably provided with a scraper to prevent buildup, said scraper not shown in FIG. 1 for clarity) spreads the powder within the chamber by translation from powder cylinder 14 toward and across target surface 4 at the surface of part bed 7 above part piston 6, in the manner described in the above-referenced PCT Publication 88/02677 and copending application Ser. No. 789,358. At the time that roller 18 is providing powder from powder piston 14, target surface 4 (whether a prior layer is disposed thereat or not) is preferably below the floor of chamber 2 by a small amount, for example 5 mils, to define the thickness of the powder layer to be processed. It is preferable, for smooth and thorough distribution of the powder, that the amount of powder provided by powder cylinder 14 be greater than that which can be accepted by part cylinder 6, so that some excess powder will result from the motion of roller 18 across target surface 4; this may be accomplished by the upward motion of powder piston 14 by a greater amount than the distance below the floor of chamber 2 that target surface 4 is set at (e.g., 10 mils versus 5 mils). It is also preferable to slave the counter-rotation of roller 18 to the translation of roller 18 within chamber 2, so that the ratio of rotational speed to translation speed is constant.

Further in operation, after the transfer of powder to target surface 4, and the return of roller 18 to its original position near powder piston 14, laser 10 selectively sinters portions of the powder at target surface 4 corresponding to the cross-section of the layer of the part to be produced, in the manner described in the above-referenced U.S. Patents, PCT Publication, and pending applications. After completion of the selective sintering for the particular layer of powder, part piston 6 moves downward by an amount corresponding to the thickness of the next layer, awaiting the deposition of the next layer of powder from roller 18 to be added to part bed 7.

Figure 3A:
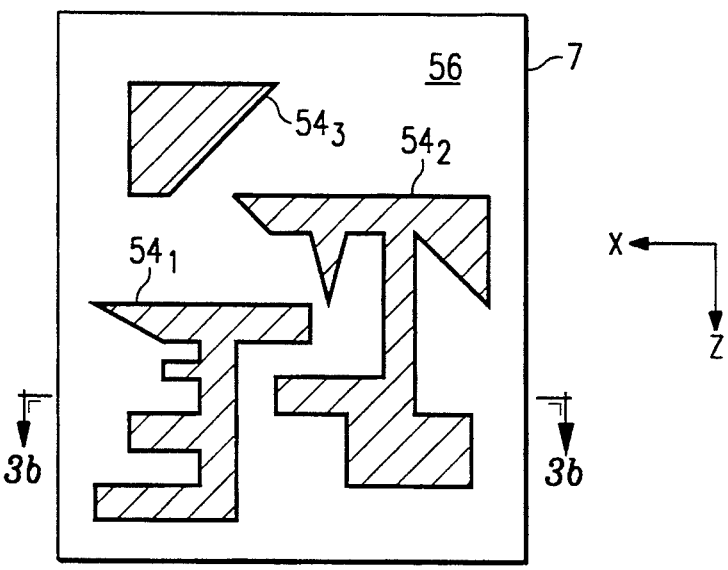
FIGS. 3a and 3b are cross-sectional diagrams, in the vertical and horizontal directions, respectively, of an example of a part bed including multiple objects formed therewithin.
Figure 3B:
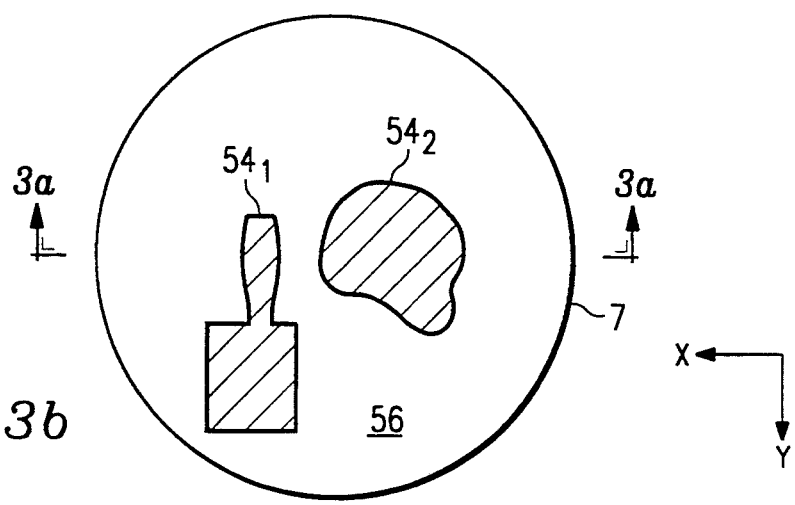

Referring now to FIGS. 3a and 3b, examples of object is 54 being formed from powder by selective laser sintering will now be described in their position in part bed 7. As illustrated in these FIGS. 2a and 2b, due to the formation of objects in layerwise fashion, the selective laser sintering process is equally useful in forming multiple objects in a single build cycle as it is in forming a single object, assuming that the dimensions of the multiple objects are small enough to fit within part bed 7 above part piston 6.

FIG. 3a illustrates, in cross-sectional elevation view, the position of three objects 54 within a single part bed 7. As shown in FIG. 3a, the layerwise approach of the selective laser sintering process, together with the support provided by unsintered powder 56 in this process, enables the formation of multiple unconnected objects 54 within a single part bed 7, and thus in a single "build cycle" (i.e., layerwise formation of part bed 7 from bottom to top). The ability to fabricate objects 54 of somewhat complex shape, including overhanging portions, is intended to be conveyed by FIG. 3a; of course, as evidenced by actual use of the selective laser sintering process, objects of much more complex shape than those illustrated in FIG. 3a may be formed.

FIG. 3b illustrates, in plan cross-sectional view, the position of objects $54_1$, $54_2$ at a selected layer of part bed 7. In this example, object $54_1$ has a protrusion of elliptical cross-section from a rectangular portion, while object $54_2$ has an irregular cross-section. Further, it should be noted that object $54_1$ has locations nearer to the edge of part bed 7 than does object $54_2$; this variation in distance from the outer edge of part bed 7 may affect the uniformity of process result, as will be described hereinbelow.

Upon completion of the build cycle, part bed 7 is removed from the apparatus of FIG. 1, and the unsintered powder therewithin is removed mechanically from the object(s) formed of the sintered powder in part bed 7. If desired, based on the material used as the powder and upon the final use of the object(s), post-process annealing and other post-processing activity may then be applied to the object(s) so formed.

In the apparatus of FIG. 1, radiant heater 30 is also included in order to control the thermal activity of the sintered and unsintered powder at target surface 4. Ring-shaped radiant heater 30 has been found to be especially beneficial in providing such control, due to the high degree of uniformity with which it delivers energy per unit area, and also due to its ring shape which allows it to be placed coaxially with the target surface and allow the energy beam to pass therethrough to target surface 4. Radiant heater 30 is suspended over target surface 2 from the top of chamber 2 (such top not shown), either by chains, wire, a fixed bracket, or other appropriate mounting apparatus. The uniform temperature control provided by radiant heater 30 facilitates the optimization of target surface 4 to minimize the thermal distortion effects of growth and curling of the part produced by the selective laser sintering process.

Since the temperature of target surface 4 can change during the build cycle, feedback and control of radiant heater may be included in the selective laser sintering apparatus. The apparatus of FIG. 1 thus includes infrared temperature sensor 34, directed at target surface 4 to measure the temperature of sintered and unsintered powder thereat, and also infrared temperature sensor 36, directed at radiant heater 32 to measure its radiation output. The output of sensors 34, 36 are monitored by conventional equipment (not shown), for controlling the current or other energy applied to radiant heater 32.

Thermal control of target surface 4 is also maintained by control of the direction and temperature of gas flowing through the chamber. U.S. Pat. No. 5,017,753 and International Publication WO 92/08592, both incorporated herein by reference, describe gas flow methods for controlling the temperature of sintered and unsintered powder at target surface 4. These methods include downdraft of heated or cooled gas through the sintered and unsintered powder as described in U.S. Pat. No. 5,017,753, and tangential flow of heated or cooled gas across target surface 4 as described in International Publication WO 92/08592. It is further contemplated that a combination of these techniques may also be used, where a portion of the gas flow passes through the powder and is exhausted from below the floor of chamber 2, with the remainder of the flow exhausted from the sides, back or top of chamber 2 itself.

These techniques of radiant heating and controlled temperature gas flow have been found to be important in the reduction of thermal distortion effects such as curling and growth, particularly for sensitive materials such as waxes and nylon. Even with close control of these factors, inconsistencies have been observed in the formation of object cross-sections. According to the present invention, it has been found that these inconsistencies are due to variations in the time between overlapping laser scans over the cross-section being formed.

Figure 4A:
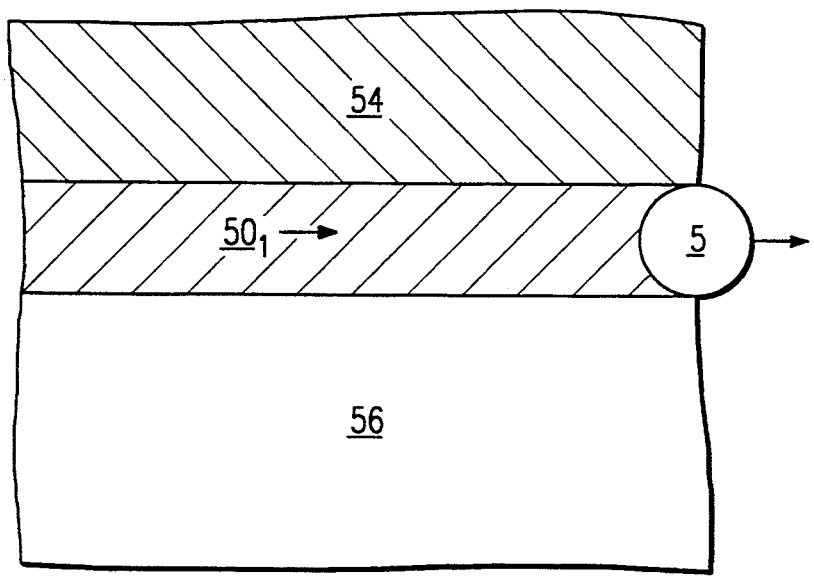
FIGS. 4a and 4b are plan microscopic views of a portion of powder at the target surface and illustrating the overlapping position of scans of the laser beam thereover.
Figure 4B:
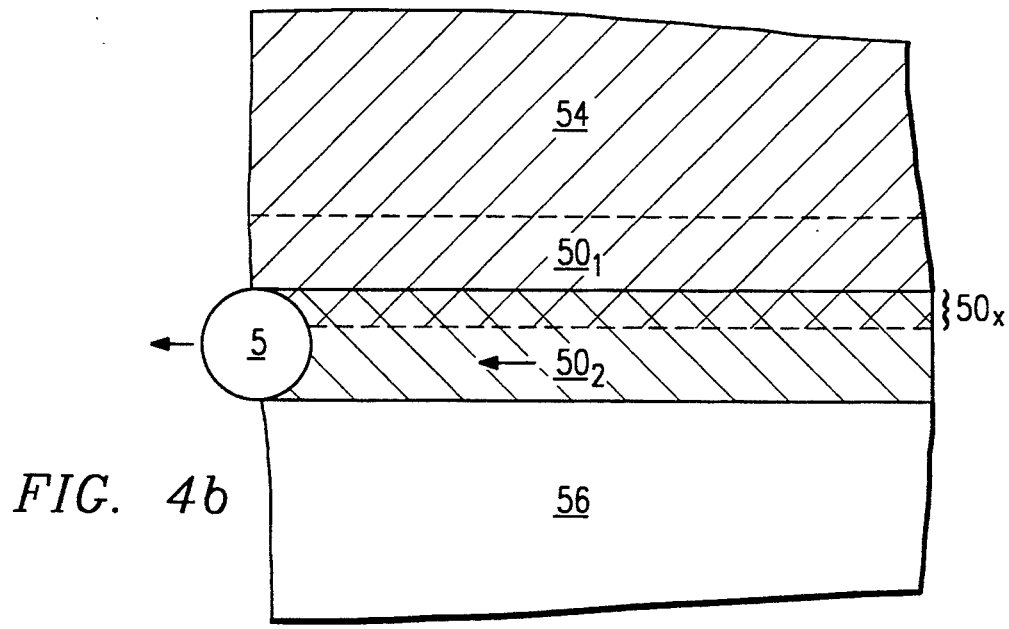

As described in the above-referenced U.S. Pat. No. 5,155,324, the spot size of laser beam 5 is preferably selected so that adjacent scanned regions overlap one another. For example, the laser spot size is preferably on the order of 0.020 to 0.030 inches, with the distance between scans, centerline to centerline, on the order of 0.010 to 0.020 inches, resulting in overlap of the laser scans of up to on the order of 0.020 inches. This overlap ensures that the adjacent sintered portions of the powder in the layer at target surface 4 are sintered to one another, providing structural integrity for the part being formed. Referring now to FIGS. 4a and 4b, an illustration of such overlap will now be described.

FIG. 4a illustrates a small portion of the target surface being scanned by laser beam 5 in the selective laser sintering of a powder layer. At the location illustrated in FIG. 4a, region $50_1$ is being scanned by laser beam 5 in the formation of an object cross-section, and as such is at the boundary between sintered powder 54 and unsintered powder 56. In the sintering of region $50_1$, laser beam 5 is scanning from left-to-right, and has a beam spot size of on the order of 0.030 inches, so that the width of region $50_1$ is on the order of 0.030 inches.

FIG. 4b illustrates the scanning of the next adjacent portion of the target surface. As illustrated in FIG. 4b, the next scan of laser beam 5 is over region $50_2$, with laser beam 5 traveling in the opposite, right-to-left direction. In this example, the centerlines of adjacent scan regions $50_1$, $50_2$ increment by on the order of 0.020 inches, resulting in region $50_x$ of the powder that receives laser energy from laser beam 5 from the scans of both of regions $50_1$ and $50_2$; in this example, the width of overlapped region $50_x$ is on the order of 0.010 inches. This overlap ensures that the object produced from sintered powder 54 is of good structural integrity.

It has been discovered that, in order to make objects with consistent structural and textural quality and with minimal distortion, the conditions under which this overlap of adjacent laser scans is performed be highly repeatable, from a the final standpoint. A valid approximation of the heat flow in the selective laser sintering process may be considered one-dimensionally, with constant coefficients, as follows:

$$\rho C[\delta T/\delta t] = \chi[\delta^2 T/\delta x^2] + S(x,t) \qquad [1]$$

where the powder being sintered has $\chi$ as its thermal conductivity, C as its heat capacity, and $\rho$ as its effective density, and where S represents the laser heat x the distance into the powder under consideration and t represents the time variable. It is understood that equation [1] is a somewhat rough approximation of the thermal process, since the powder factors $\chi$, C and $\mu$ will change as a function of the degree to which the powder is sintered. However, an order analysis of equation [1] is useful in illustrating the time dependence of the thermal conditions. Such an order analysis suggests:

$$\rho C[\delta T/\delta t] \nabla \chi[(T - T_\delta/\delta^2] \qquad [2]$$

where $T_\delta$ is the temperature of the powder layer under the layer being sintered ($T_\delta$ assumed to be approximately constant during the time that the overlying layer is being sintered), and where $\delta$ is the thickness of a sintered single layer of powder (into the page of FIGS. 3a, 3b).

Given the order analysis of equation [2], a time constant for the heat flow of equation [1] may be calculated as follows:

$$\tau \nabla [\rho C \delta^2 / \chi] = \delta^2 / \alpha \qquad [3]$$

where $$\alpha = \chi / \rho C \qquad [4]$$

For the typical case of plastic powder and a laser as described above, $\alpha$ is on the order of $10^{-7}$ $m^2$/sec, $\delta$ is on the order of 500 microns, and the time constant $\tau$ is approximately 0.25 seconds. According to the present invention, this time constant of thermal flow at the sintering location is considered in ensuring repeatable overlap of the scanned powder, as will be discussed hereinbelow.

Figure 5:
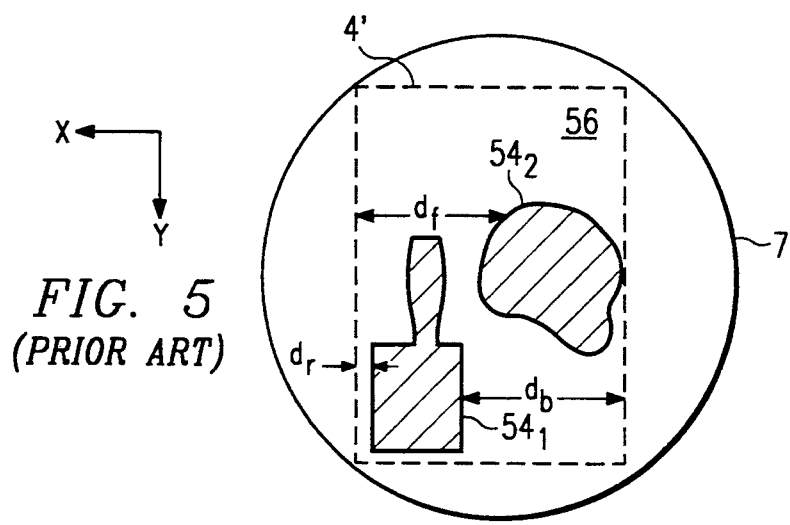
FIG. 5 illustrates, in plan view, the scanning of the objects illustrated in FIGS. 3a and 3b in the conventional manner.

FIG. 5 illustrates the scanning of part bed 7 according to conventional techniques, relative to exemplary objects $54_1$, $54_2$. For conventional selective laser sintering in raster scan mode, laser beam 5 is scanned over scan area 4', and is modulated on and off according to the locations at which the object is to be formed. Scan area 4' is conventionally selected to approximate the maximum portion of target surface 4 in which objects 54 may be formed, regardless of the actual location or shape of the object 54 to be formed in any particular layer. In this example of raster scan mode, laser beam 5 scans in the x-direction and increments in the y-direction (i.e., the x-axis is the "fast" axis in the raster scan).

As illustrated in FIG. 5, scanning over scan area 4' results in much different time-to-return values for various features being sintered. Due to the location of object $54_2$ from the far left edge of area 4, the distance $d_f$ is quite significant relative to the short distance between the left edge of scan area 4' and object $54_1$. As a result, the time-to-return for object $54_2$ is much longer than that for object $54_1$, and accordingly the heat produced by a prior scan flows to a greater degree for object $54_2$ than for object $54_1$ before the next overlapping scan.

For example, laser beam 5 may scan at a speed of on the order of 40 inches per second. For target surface 4 of an 18" diameter, the time-to-return difference between the rectangular portion of object $54_1$ and object $54_2$ may be on the order of 0.2 seconds. Considering that a typical heat flow time constant is on the order of 0.25 seconds, as calculated above, the thermal conditions of the two objects will be significantly different. It has been observed that such different conditions can greatly affect the quality of the object being formed.

In addition, the offset position of object $54_1$ in scan area 4' also results in different time-to-return depending upon the direction of the scan. In the example of FIG. 5, the time-to-return for a left-to-right scan, for the rectangular portion of object $54_1$, is relatively short considering the short distance $d_r$ from the left edge of scan area 4' to object $54_1$. For a right-to-left scan, however, the time-to-return will be somewhat longer, considering the longer distance $d_b$ from the right edge of scan area 4' to object $54_1$. Using the example of 40 in/sec scan rate, the difference in time-to-return may be on the order of 0.20 seconds, as above. As a result of this difference in time-to-return, opposing sides (in the x-dimension) of the same object $54_1$ will have different thermal conditions at their edges, and thus non-uniform structural, textural, and distortional characteristics.

The present invention considers the heat flow at the sintered location in ensuring that the thermal conditions are uniform in the overlap region $50x$ at the time that an overlapping scan is taking place, independently of the position of the object in part bed 7, and independently relative to its shape.

According to the present invention, the scan area is defined in such a manner as to improve the uniformity of the time-to-return for each overlapping scan in the cross-section of the object being formed. The definition of the scan areas may be accomplished in such a manner as to minimize scan time, depending upon the complexity of the scan routine desired, as will be described hereinbelow.

Figure 6A:
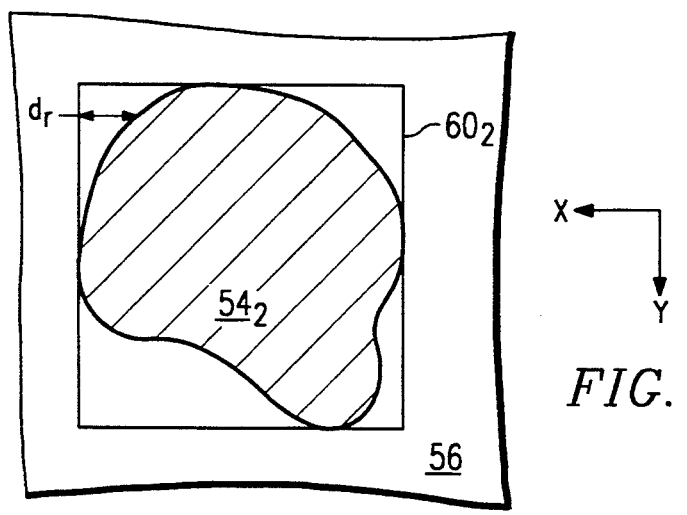
FIGS. 6a and 6b are plan views of a layer (and portion) being formed in the part bed of FIGS. 3a and 3b, illustrating the scan boundaries according to a first embodiment of the present invention.

Referring first to FIG. 6a, object $54_2$ in the layer illustrated in FIG. 3b is illustrated according to a first embodiment of the invention. As shown in FIG. 6a, minimal rectangular scan area $60_2$ is defined around the cross-section of object $54_2$ in this layer. Scan area $60_2$ is defined according to the widest portion of object $54_2$ in each of the x and y dimensions, and has its boundaries either at or slightly beyond (e.g., on the order of 0.100 inches) the boundaries of the object cross-section $54_2$. As a result, the time-to-return guaranteed to be much reduced from that which results when the scan area 4' is defined according to the portions of the target surface 4 of the part bed 7 in which objects 54 may reside, as shown in FIG. 5. While distances $d_r$ from the x-dimension edges of scan area $60_2$ to the edge of the object cross-section $54_2$ will still vary to some degree, as is apparent from FIG. 6a, this variation will necessarily be much less than that resulting from scan area 4' of FIG. 5, defined according to the potential location of objects in part bed 7.

Also according to this embodiment of the invention, minimal scan area $60_2$ is preferably defined according to the cross-section of objects 54 in each layer of part bed 7. In other words, as the size and location of objects 54 vary in the z-dimension (see FIG. 3a), according to this embodiment of the invention the scan areas 60 are also preferably redefined in each layer so as to conform to the size and location of the object 54 cross-sections in that layer. As a result, variation in the time-to-return will not only be reduced within a single layer, but also from layer to layer as objects 54 are fabricated.

Figure 6B:
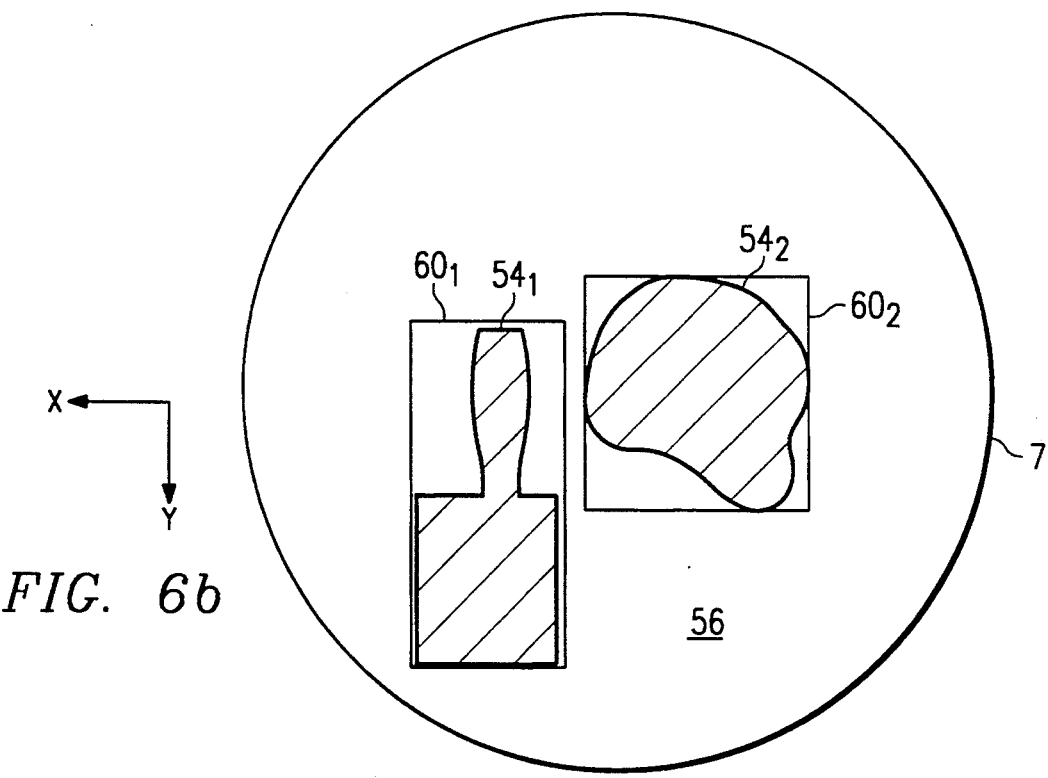

In the case where multiple objects 54 are being formed that have cross-sections in the same layer, as well as where portions of the same object 54 are being formed in the same layer but in an unconnected manner, it is contemplated that each object 54 cross-section will have its own minimal scan area 60. For example, FIG. 6b illustrates the definition of minimal scan area $60_2$ for object $54_2$, as well as a separate minimal scan area $60_1$ for object $54_1$. As is evident in FIG. 6b, the definition of scan areas 60 is made not only according to the maximum x and y dimensions of the objects, but is also offset from the center of target surface 4 of part bed 7 according to the location of the object 54 cross-sections in that layer. Accordingly, variation in the structural characteristics of multiple objects 54 formed in the same layer is also minimized according to this embodiment of the invention.

In operation, computer 40 that controls laser 10 (see FIG. 1) according to a computer-aided-design (CAD) data base storing the design dimensions of objects 54 is contemplated to be able to calculate the location and size of each of minimal scan areas 60. As is well known in the art of selective laser sintering and CAD/CAM (computer-aided-manufacture), slicing programs are readily available which operate upon solid form CAD data bases to define cross-sectional slicing of the object, as necessary in the performance of selective laser sintering and stereolithography processes. It is contemplated that the programming of such a computer in order to calculate the minimal scan areas 60 for each object 54 in each layer of the part bed 7 will be well within the capability of one of ordinary skill in the art in this field, and can be readily accomplished according to conventional techniques.

Referring again to FIG. 6a, it can be noted that, while the variation in the distances $d_b$ between the left and right edges of scan area $60_2$ and the edges of object $54_2$ is much reduced from that according to conventional scanning (shown in FIG. 5), some amount of variation in the distance $d_b$ over the scans forming object $54_2$, including variation between adjacent scans in opposite directions. This is especially the case where the object has significant variations in its x-dimensional (i.e., the fast axis in the raster scan) width, as in the case of object $54_2$ in FIG. 6a. Furthermore, it is apparent that the total time required for the scanning of the laser over area $60_2$ includes that required to scan over portions that will not be fused by laser beam 5, and as such is not optimized.

Figure 7:
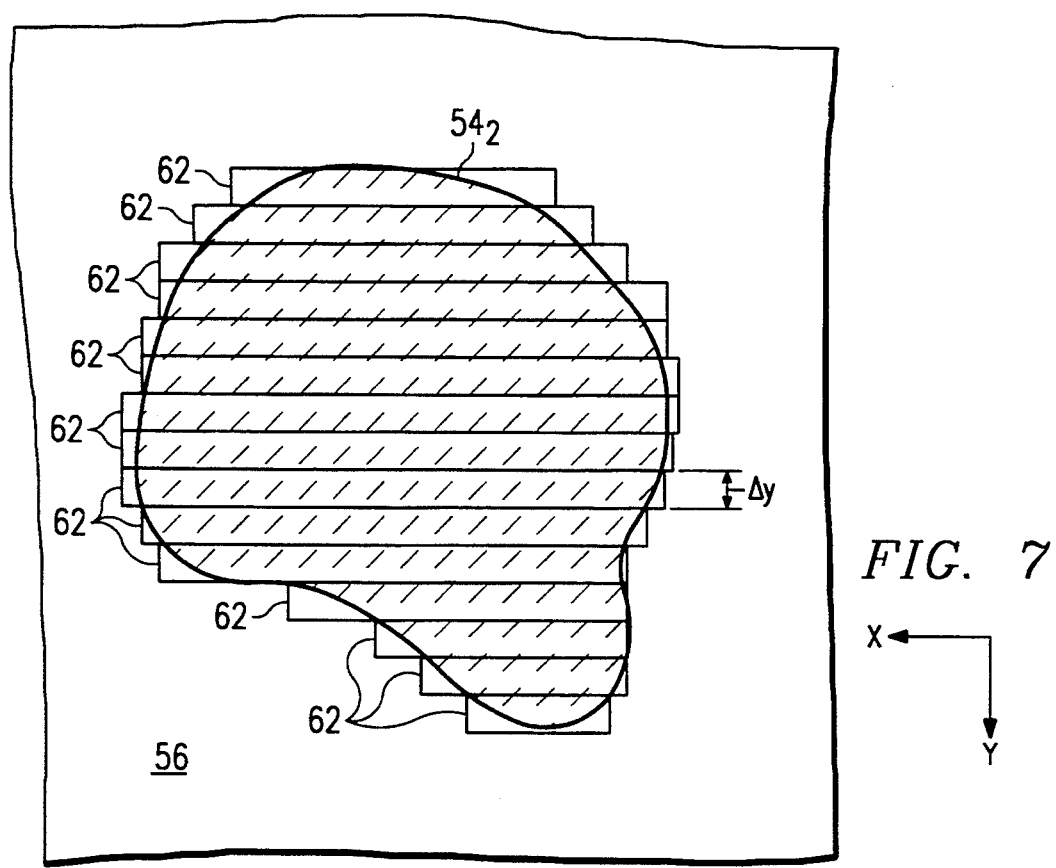
FIG. 7 is a plan view of a layer being formed in the part bed of FIGS. 3a and 3b, illustrating the scan boundaries according to a second embodiment of the present invention.

According to a second embodiment of the invention, therefore, multiple scan areas 62 are provided for a single cross-section of each object 54, to further minimize the variations in the time-to-return over an object cross-section. FIG. 7 illustrates the location of multiple scan areas 62 for object 54₂ in one of its layers, according to this second embodiment of the invention.

According to this embodiment of the invention, multiple scan areas 62 are defined for object 54₂, each scan area having a width Δy in the y dimension; as noted above, in this example, the x direction is the fast axis for the raster scan, with the y direction corresponding to the direction in which the positions of the scans increment from scan to scan. The distance Δy is selected by making a tradeoff between calculation complexity, on the one hand, and time-to-return uniformity and reduced scan time, on the other hand. The uniformity of time-to-return and minimal scan time may be achieved by defining each scan area 62 for a single scan (i.e., each scan line in the x-direction has its endpoints defined by the boundary of the object 54₂ being produced), but at a cost of cumbersome computational load. Accordingly, it is contemplated that the optimal arrangement will generally include several scan lines within each scan area 62.

As a result of this embodiment of the invention, therefore, the overall scan time of the object 54₂ cross-section will be reduced from that of the single minimal scan area 60 discussed above. In addition, due to the ability to more closely approximate the edges of the object 54₂ cross-section, the uniformity of time-to-return for object cross-section 54₂ will be further improved according to this alternative embodiment. Both of these benefits will come at a cost of increased computational load, relative to the first embodiment of the invention.

It should further be noted that while multiple scan areas 62 are defined to have a width Δ in the y-dimension in this example, as the x-dimension is the fast axis for the raster scan, the multiple scan areas 62 will be orthogonal to those shown in FIG. 7 if the y-dimension is the fast raster scan axis. While the fast scanning axis may be maintained constant for each layer of powder in the layerwise fabrication of the part, alternately, as described in the above-referenced U.S. Pat. No. 5,155,324, it may be preferable to alternate the directions of scan from layer-to-layer during the build cycle, in which case the orientation of the multiple scan ares 62 according to this embodiment of the invention will similarly alternate.

In either of the above alternatives, other control techniques may also be used in combination with the reduced scan areas to further improve the uniformity of the object being produced. As noted above, conventional use of radiant heaters and heated directed gas flow, individually or in combination with one another, will generally be required in order to maintain dimensional integrity. Furthermore, according to the present invention, the laser power may be modulated according to the shape of the object in a particular scan area or object, with such modulation selected in order to minimize thermal variations; such modulation of laser power will further improve the structural uniformity of the object being fabricated.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of producing an object by selective laser sintering, comprising the steps of:
   dispensing a first layer of heat-fusible powder over a target surface having a width in a first direction;
   defining a first scanning region of the target surface for a first cross-section of the object to be formed in the first layer of powder, said first scanning region having a width, in the first direction, substantially equal to the maximum width of the first cross-section in the first direction, and substantially smaller than the width of the target surface in the first direction;
   scanning a directed energy beam in the first direction, beginning at a first end of said first scanning region and stopping upon reaching a second end of said first scanning region;
   modulating the directed energy beam on and off during said scanning step so that the directed energy beam is turned on over selected portions of the first layer of powder corresponding to the first cross-section, to fuse the powder thereat; and
   repeating said scanning and modulating steps in such a manner that adjacent scans of the directed energy beam overlap one another over the target surface.

2. The method of claim 1, further comprising:
   dispensing a second layer of powder over the first layer, after said repeating step;
   defining a first scanning region of the target surface for a second cross-section of the object to be formed in the second layer of powder, said first scanning region having a width, in a selected direction, substantially equal to the maximum width of the second cross-section in the selected direction, and substantially smaller than the width of the target surface in the selected direction;
   scanning the directed energy beam parallel to the selected direction, beginning at a first end of said first scanning region for the second cross-section and stopping upon reaching a second end of said first scanning region for the second cross-section;
   modulating the directed energy beam on and off during said scanning step so that the directed energy beam is turned on over selected portions of the second layer of powder corresponding to the second cross-section, to fuse the powder thereat, with fused portions of the second layer of powder fusing to fused portions of the first layer of powder thereunder; and
   repeating said scanning and modulating steps in such a manner that adjacent scans of the directed energy beam overlap one another over the target surface.

3. The method of claim 2, wherein the selected direction is parallel to the first direction.

4. The method of claim 2, wherein the selected direction is not parallel to the first direction.

5. The method of claim 1, further comprising:
   defining a second scanning region of the target surface for the first cross-section;
   wherein said first and second scanning regions correspond to a first area and a second area, respectively, of the first cross-section;
   wherein said first scanning region has a width, in the first direction, substantially equal to the maximum width, in the first direction, of the first cross-section in the first area, and substantially smaller than the width of the target surface in the first direction;

wherein said second scanning region has a width, in the first direction, substantially equal to the maximum width, in the first direction, of the first cross-section in the second area, and substantially smaller than the width of the target surface in the first direction;

and wherein, for said second scanning region, said scanning step scans also the directed energy beam in the first direction, beginning at a first end of said second scanning region and stopping upon reaching a second end of said second scanning region.

6. The method of claim 5, further comprising:

dispensing a second layer of powder over the first layer, after said repeating step;

defining first and second scanning regions of the target surface, corresponding to first and second areas, respectively, of a second cross-section of the object to be formed in the second layer of powder, said first and second scanning regions having a width, in a selected direction, substantially equal to the maximum width of the second cross-section in said first and second scanning regions, respectively, in the selected direction, and substantially smaller than the width of the target surface in the selected direction;

scanning the directed energy beam in a direction parallel to the selected direction, beginning at a first end of said first and second scanning region for the second cross-section and stopping upon reaching a second end of said first scanning region for the second cross-section;

scanning the directed energy beam in a direction parallel to the selected direction, beginning at a first end of said second scanning region for the second cross-section and stopping upon reaching a second end of said first scanning region for the second cross-section;

modulating the directed energy beam on and off during each of said scanning steps so that the directed energy beam is turned on over selected portions of the second layer of powder corresponding to the second cross-section, to fuse the powder thereat so that fused portions of the second layer of powder fusing to fused portions of the first layer of powder thereunder; and repeating said scanning and modulating steps in such a manner that adjacent scans of the directed energy beam overlap one another over the target surface.

7. The method of claim 1, wherein a plurality of cross-sections of an object are to be formed in the first layer of powder;

and further comprising:

defining a first scanning region of the target surface for each of the plurality of cross-sections to be formed in the first layer of powder, each of said first scanning regions having a width, in the first direction, substantially equal to the maximum width, in the first direction, of its associated one of the plurality of cross-sections, and substantially smaller than the width of the target surface in the first direction;

wherein said scanning step scans the directed energy beam in a direction parallel to the first direction over each of said first scanning regions, each scan beginning at a first end of one of said first scanning regions and stopping upon reaching a second end thereof;

and wherein said modulating step is performed so that the directed energy beam is turned on over selected portions of the first layer of powder corresponding to each of the plurality of cross-sections, to fuse the powder thereat.

8. The method of claim 1, wherein adjacent scans of the directed energy beam are in the same direction as one another.

9. The method of claim 1, wherein adjacent scans of the directed energy beam are in opposite direction from one another.

10. An apparatus for fabricating a part, comprising the steps of:

a target surface, having a width in a first direction;

means for dispensing layers of a solidifiable material at said target surface; and means for scanning an energy beam across said solidifiable material at said target surface while modulating said energy beam on and off, said energy beam of sufficient energy to fuse said solidifiable material at said target surface when on, wherein said energy beam is turned on by said scanning means at locations corresponding to a cross-section of the part;

wherein said scanning means is programmed to scan said energy beam beginning at a first end of a defined first scanning region of the target surface for the cross-section of the object to be formed and stopping at a second end of the first scanning region, said first scanning region having a width, in the first direction, substantially equal to the maximum width of a first area of the cross-section in the first direction, and substantially smaller than the width of the target surface in the first direction.

11. The apparatus of claim 10, wherein said scanning means is also programmed to scan said energy beam beginning at a first end of a defined second scanning region of the target surface for the cross-section of the part and stopping at a second end of the second scanning region;

and wherein said second scanning region has a width, in the first direction, substantially equal to the maximum width, in the first direction, of a second area of the cross-section of the part in the first direction, and substantially smaller than the width of the target surface in the first direction.

12. The apparatus of claim 10, wherein said scanning means comprises:

a laser;

a plurality of mirrors for directing said laser beam toward the target surface; and a computer for controlling said plurality of mirrors to scan the laser beam across the target surface.

* * * * *